(12) United States Patent
Samuel

(10) Patent No.: US 8,988,038 B2
(45) Date of Patent: Mar. 24, 2015

(54) APPARATUS FOR CHARGING BATTERY POWERED ELECTRONIC DEVICES USING A ROLLING MEANS

(75) Inventor: Wilson Samuel, Warrenton, MO (US)

(73) Assignee: Samuel Wilson, Saint Charles, MO (US)

( * ) Notice: Subject to any disclaimer, the term of this patent is extended or adjusted under 35 U.S.C. 154(b) by 596 days.

(21) Appl. No.: 13/445,993

(22) Filed: Apr. 13, 2012

(65) Prior Publication Data

US 2013/0271063 A1    Oct. 17, 2013

(51) Int. Cl.
*H02J 7/00*    (2006.01)
(52) U.S. Cl.
USPC ............................ 320/107; 320/103; 190/123
(58) Field of Classification Search
USPC .......................................................... 320/107
See application file for complete search history.

(56) References Cited

U.S. PATENT DOCUMENTS

| | | | |
|---|---|---|---|
| 5,782,325 A * | 7/1998 | O'Shea et al. | 190/18 A |
| 6,119,835 A * | 9/2000 | Lin | 190/127 |
| 6,260,680 B1 * | 7/2001 | Lin | 190/119 |
| 2009/0284022 A1 * | 11/2009 | Usselman et al. | 290/38 R |

* cited by examiner

*Primary Examiner* — Yalkew Fantu
(74) *Attorney, Agent, or Firm* — Antonio G. Tapia

(57) ABSTRACT

The present invention provides a new and useful apparatus for charging battery powered electronic devices using a rolling means. The rolling means transfers mechanical energy from a plurality of wheels to a generator by way of a gear ratio. The generator in turn yields electrical energy that is later transformed via integrated circuitry into viable power for the purposes of charging an optional internal batter or that of an attached device. This apparatus does not limit the user's mobility and can be used in everyday settings. The apparatus can be an integral part of a piece of luggage or added to an existing hand cart. Additionally, the apparatus can have a connection for a DC input to charge the internal battery when the apparatus is not in motion.

18 Claims, 4 Drawing Sheets

APPARATUS FOR CHARGING BATTERY POWERED ELECTRONIC DEVICES USING A ROLLING MEANS

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

TECHNICAL FIELD

The present invention is in the technical field of charging electronic devices. More particularly, the present invention is in the technical field of portable charging devices.

BACKGROUND OF THE INVENTION

Electronic devices are a ubiquitous part of modern life. These devices are usually powered by a DC power source. In the case of portable electronic devices, like cell phones, laptop computers and the like, an internal battery is most commonly used to supply the DC power. In turn an external DC power source, like an AC adapter, may be used to charge the internal battery of the device. Alternatively, the electronic device can be powered exclusively by a ancillary DC power source, like an AC adapter that is permanently attached while the device is in use—of course, thereby requiring a corresponding AC power source, such as a wall outlet, during use or charging.

Consider a smart phone device as an example. When turned on, smart phones receive phone calls and electronic data at all times—thereby affecting a constant power drain on the internal battery. The drain is only more exacerbated when the user actively interfaces with the device. After prolonged use, the user must begin to act to conserve power remaining in the battery or seek a wall outlet to charge the device. In the inventors experience, it is not always likely that the user is near a wall outlet or USB port to recharge the smart phone for continued use. The inventor is keenly aware of this scenario, especially when traveling between destinations.

For this reason, a market has developed for ancillary devices to facilitate charging of devices. For example, many people have a car charger for their cell phone. However, to date there is no practical solution for individuals who are traveling by foot. The target user may be a student who travels between classes, a pedestrian who walks from public transportation towards her place of residence or employment, or workers in their field. In the applicant's experience the need for such a charging device is most evidenced by travelers in airport terminals. Often times, travelers spend a portion of their layovers seeking wall outlets, resorting to those in the restrooms or standing in lines around limited dedicated charging kiosks.

The need to charge battery operated devices when one is away from a wall outlet is not only limited to smart phones. Any device that uses a battery and is used during daily life or work exhibits this need. Examples include inventory tracking devices used in warehouses, tablets, and portable computers.

Currently there is a long felt need for one to charge the batteries of electronic devices when away from a wall outlet. Prior art devices range from car chargers to crank operated generators. In the applicant's experience there is a deficiency in the existing and prior art crank operated generators because one must operate the hand crank at virtually a continuous rate to power and or charge an electronic device. The user has to devote their entire attention to cranking the generator, which will require stationary use in most cases. This does not address the need for a charging means while the operator is in motion.

Some crank operated generator devices include an internal battery to supplement the crank operated generator. Although crank operated generators exist that have internal batteries, these are single purpose devices that are intended for use during emergency situations, like power outages or during camping trips. While relatively small, one would not carry one of these devices with them on a daily basis or while travelling—for example in an airport. Further, these devices would be impractical or disfavored for use during daily life, in particular any place that a car charger or AC adapter could be used.

There is a portable charger disclosed in U.S. patent application publication U.S. 2007/0285053 A1. This device has a crank operated generator and an internal rechargeable battery. The internal battery can be charged by the crank operated generator or by a 9 volt DC adapter source. As mentioned earlier, one would not carry this type of device with them during the course of their daily life, let alone operate the crank while traveling by foot. The mobility of the user is limited by this device and both hands/arms of the user are needed to operate the device, one hand to hold the handle of the device and the other to turn the crank. In order to use this device with one hand the device would have to be anchored in place to prevent the torque transferred from the crank to the rest of the device from causing the device to tip over. Anchoring of the device would only further frustrate the mobility of the user. For this and other reasons the device disclosed in the patent application publication does not answer the needs addressed by the present invention.

In the applicant's experience, there is a need for an apparatus for charging battery powered devices using a rolling means which: i) uses mechanical energy to produce an electrical output, ii) that can be used without inhibiting the user's mobility, iii) can be integrated into existing devices with rolling means and iv) can be integrated into daily life by users on the move. The device of the present invention is believed to accomplish all of the foregoing objectives.

SUMMARY OF THE INVENTION

The present invention is an apparatus for charging portable electronic devices that is incorporated into a rolling means, like a rolling piece of luggage. This device transforms mechanical energy into electrical energy. It does this by supplying the mechanical energy collected from the spinning wheels to a generator. This generator in turn and by way of necessary electrical components, including circuitry, charges an electronic device supplied and attached by the user—for example a cell phone. The apparatus would allow for the charging of electronic devices while the user is in motion. This apparatus is believed to be useful in any situation where a rolling means is used in everyday life. These scenarios include the use of a canyon bag while traveling, a rolling backpack for transporting text books, laptops, clothing, or even in a work setting like the use of a hand cart in a warehouse. The list is potentially endless.

In one embodiment of the present invention, the rolling means comprises a piece of luggage, having a set of wheels mechanically attached to an axle. This axle is mechanically attached to a gear ratio, which increases the number of revolutions transmitted from the axle by a predetermined factor when the wheels are in motion. The factor can be any ratio but in this embodiment the ratio is approximately 15:1. The gear ratio is mechanically attached to an AC generator which has a rotor for receiving mechanical energy. While the wheels are in motion, the rotor of the AC generator is rotated by the gear ratio. In turn, the AC generator produces an AC output. The output of the generator is electronically connected to a rectifier circuit, wherein said rectifier circuit converts the AC output into a DC output. The rectifier circuit is electronically connected to a constant DC output circuit, wherein the constant DC output circuit comprises a series of integrated circuits which can include a voltage regulator and or a smoothing capacitor which regulate the DC output. The constant DC output circuit is electronically connected to a charging circuit, wherein the charging circuit comprises integrated circuits typically used to control the charging of electrical devices. These circuits control the recharging of an internal battery and/or a battery in a user provide portable electronic device. The internal battery is electronically connected to the charging circuit and can be recharged whenever the apparatus wheels are in motion.

The apparatus also comprises a charge level indicator circuit including integrated circuits typically used to control LED lights relative to a batteries current capacity and maximum capacity. The charge level indicator circuit is electrically connected to the charging circuit and produces a visual representation of the internal batteries current capacity by employing a LED array. The apparatus also comprises a USB interface is electronically connected to the charging circuit and allows for the connection of a standard USB A cable end. A user provided electronic device, like a cell phone, can be connected to the apparatus via the USB interface and a USB cable, when connected the charging circuit will provide a DC output, in compliance with USB standards, to the electrical device. The user provided device thereby charges when attached to the apparatus.

The apparatus further comprises an enclosure, wherein the enclosure houses the mechanical and electrical components of the apparatus and is in mechanical communication with the axle and the rolling means. The apparatus can be an integral part of a piece of rolling luggage or an external addition to an existing rolling means, like a hand cart.

In another embodiment of the present invention, the apparatus further comprises an internal battery and provisions for a DC input, wherein the internal battery is charged by the charging circuit when the wheels are in motion or from a DC source, like an AC adapter, that is connected to a DC input. The DC input can be from an AC adapter with a fixed voltage and current. The voltage and current can be any value but in this embodiment the current and voltage are approximately 0.5 Amps and 5 volts respectively. Alternatively the DC input can be from a USB power source.

In another embodiment of the present invention, the apparatus comprises a DC generator rather than an AC generator and a rectifier circuit. The gear ratio for the apparatus with a DC generator can be customized to the requirements of the DC generator used for each particular application.

In another embodiment of the present invention, the apparatus further comprises a variable gear ratio, wherein the variable gear ratio can be changed between a series of preselected fixed gear ratios, for example 15:1, 20:1, 30:1, and 40:1. The higher gear ratios would be desirable in situations where the rolling apparatus will travel at relatively low speed and/or the amount of time the apparatus will be rolling is limited. Depending on the gear ratio selected with the gear ratio selector, the generator will produce a commensurate current. The current can be any value but in this embodiment the current is approximately 1 Amp. The charging circuit will in turn charge the internal battery at a normal rate or in a quick charge rate, depending on the current provided.

Thus the present invention is believed to provide a new and useful apparatus for charging electronic devices which does not limit the mobility of the user, can be used while the user is in motion, does not require the user to carry a single purpose device, and can be integrated into everyday life. Typical situations that would benefit from this apparatus would be warehouses that use hand carts to move inventory and use electronic devices to log the inventory, airport settings where individuals have to travel on foot and do not have access to a wall outlet, school and work settings where a carryon bag is used in place of a traditional book bag or brief case. The present invention is applicable in any situation where a rolling means and electronic device are used in conjunction and the user is traveling by foot.

Further features and objectives of the present invention will become apparent from the following detailed description and the accompanying drawings.

DETAILED DESCRIPTION OF THE INVENTION

As described above, the present invention provides a new and useful apparatus for charging electronic devices which does not limit the mobility of the user, can be used while the user is in motion, does not require the use to carry a single purpose device, and can be integrated into everyday life. The following description and accompanying drawings disclose at least one version of such a device.

Figure 1:
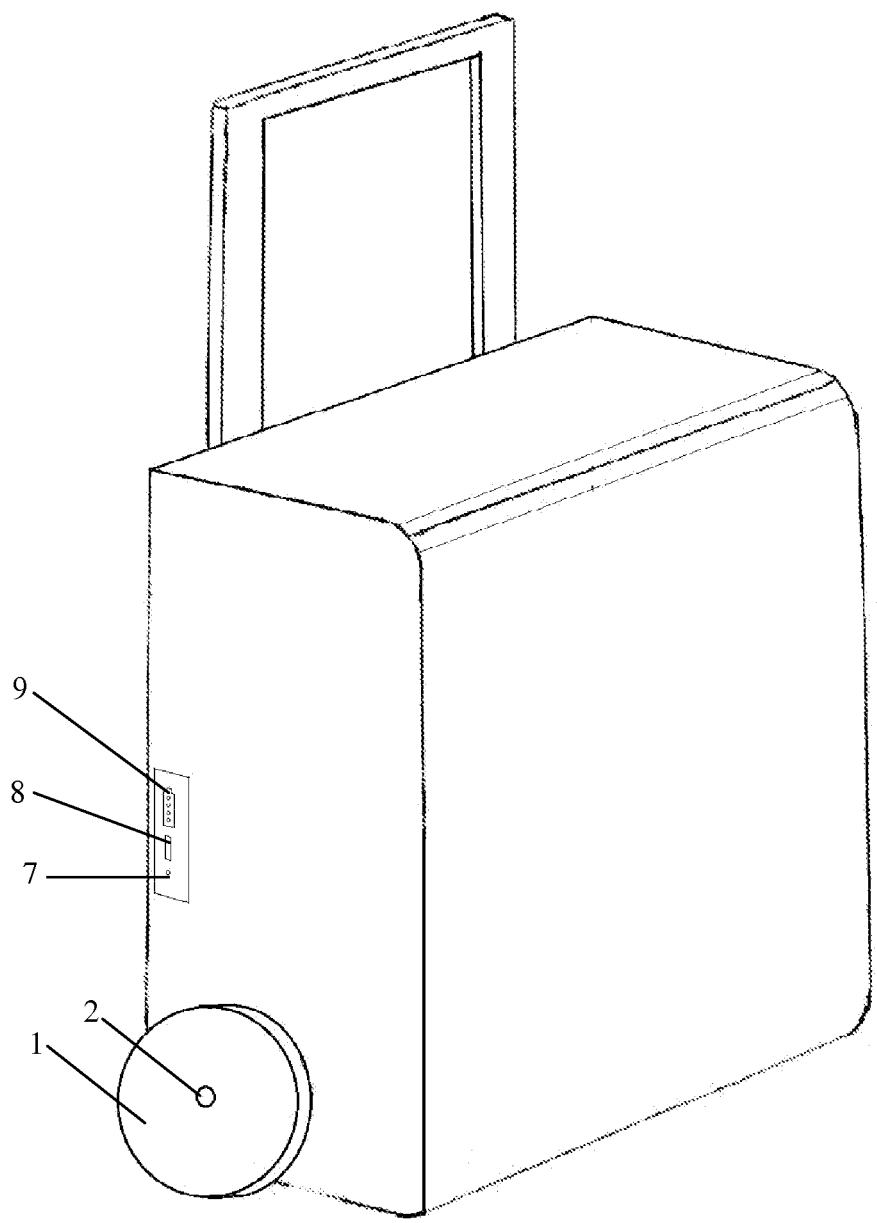
FIG. 1 is a perspective view of a the exterior of the present invention.
Figure 2:
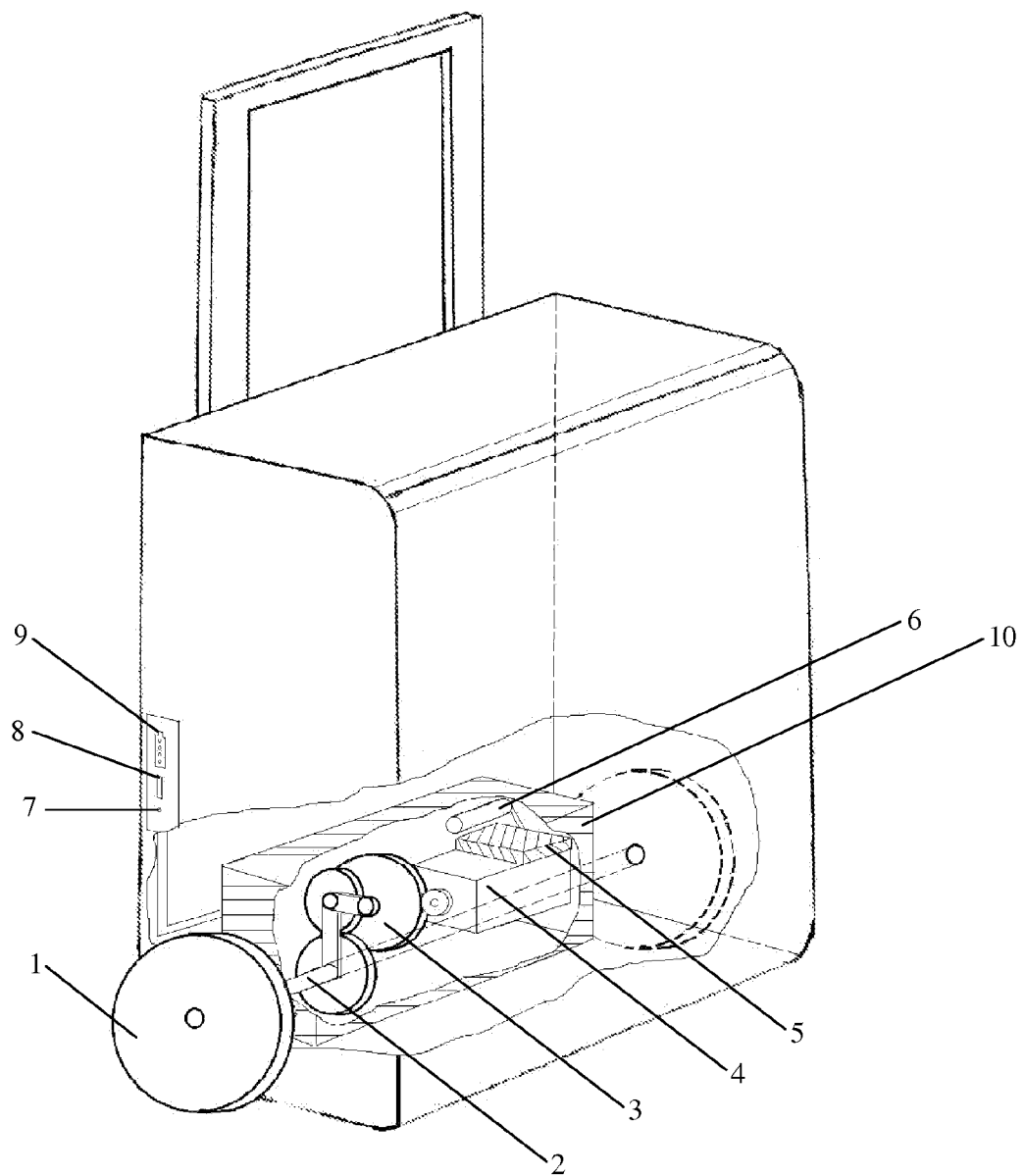
FIG. 2 is a cut-away view of the interior of the present invention.

Referring now to the invention in FIG. 1 and FIG. 2 there is shown a rolling piece of luggage, like a carryon bag, that has a DC input 7, a USB output 8, and a LED array 9. In this perspective view a plurality of drive wheels 1 can be seen, which are mechanically attached to an axel 2. From the external appearance of the present invention one would not be able to distinguish the present invention from a traditional carryon bag.

Referring now to FIG. 2 in more detail, the axle 2 is mechanically attached to a gear ratio 3. When the device is pulled by the user, the drive wheels 1 cause the axle 2 to rotate, the rotation of the axle 2 is transferred to the gear ratio 3 and the number of rotations is increased by a predetermined factor by the gear ratio 3.

The gear ratio 3 can increase the number of rotations by any factor but in this embodiment the gear ratio 3 increases the number of rotations by a factor of 15:1.

The output of the gear ratio 3 is in mechanical communication with the rotor of the AC generator 4. When the rotor of the generator 4 is rotated by the gear ratio 3, the AC generator 4 produces an AC output. The electrical leads of the AC generator 4 are electrically connected to a Printed Circuit Board Assembly (PCBA) 5. In toto, the PCBA 5 is electrically connected to the internal battery 6. An external device 18 that is provided by the user and requires charging, is then plugged into the USB interface 8 that is electrically connected to the internal battery 6. Optionally an external power source 19 can be plugged into the PCBA 5 by means of an electronically connected intermediary DC Input 7. A LED Array 9 receives input from the Charge Level Indicator Circuit 14 and provides a visual indication to the user regarding power levels. The axle 2, gear ratio 3, AC generator 4, PCBA 5, and internal battery 6 are in mechanical communication with an enclosure 10. The enclosure 10 protects the mechanical and electrical components contained within.

Figure 3:
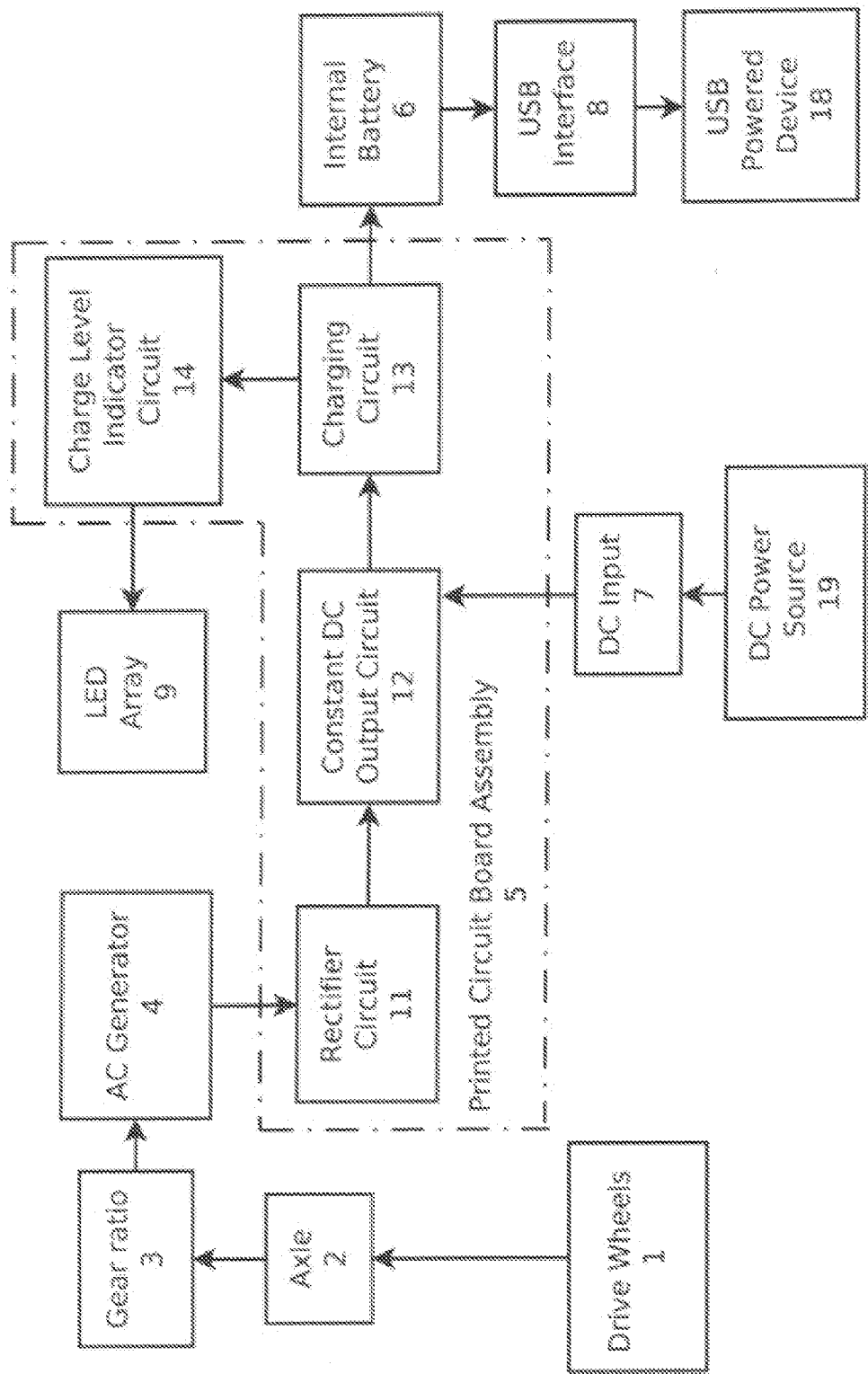
FIG. 3 is a block diagram of the present invention.

FIG. 3 is a block diagram of the embodiment shown in FIGS. 1 and 2, and shows the relationship of the physical mechanical components of the present invention working in concert and in sequence with the electrical components. The PCBA 5 comprises a rectifier circuit 11, a constant DC output circuit 12, a charging circuit 13, and a charge level indicator circuit 14—each electrically connected to the other in sequence. The rectifier circuit 11 converts the AC output from the AC generator 4 into a DC output. The DC output from the rectifier circuit 11 is conditioned by the constant DC output circuit 12. The conditioned DC output is then used by a charging circuit 13 to charge an internal battery 6 or a user provided electrical device. The internal battery 6 is electronically connected to the charging circuit 13 through the PCBA 5. The LED array 9 is electronically connected to a charge level indicator circuit 14 through the PCBA 5. The charge level indicator circuit 14 uses the LED array 9 to produce a visual representation of the current capacity of the internal battery 6.

A user provided electrical device 18 can interface with the present invention via the USB output 8. When connected with a USB cable, the electrical device 18 can be charged as follow: a) from the electrical output of the AC generator 4 or from the capacity remaining in the internal battery 6. The internal battery 6 can be charged from the output of the AC generator 4 or from a DC power source that is connected to the DC input 7.

Figure 4:
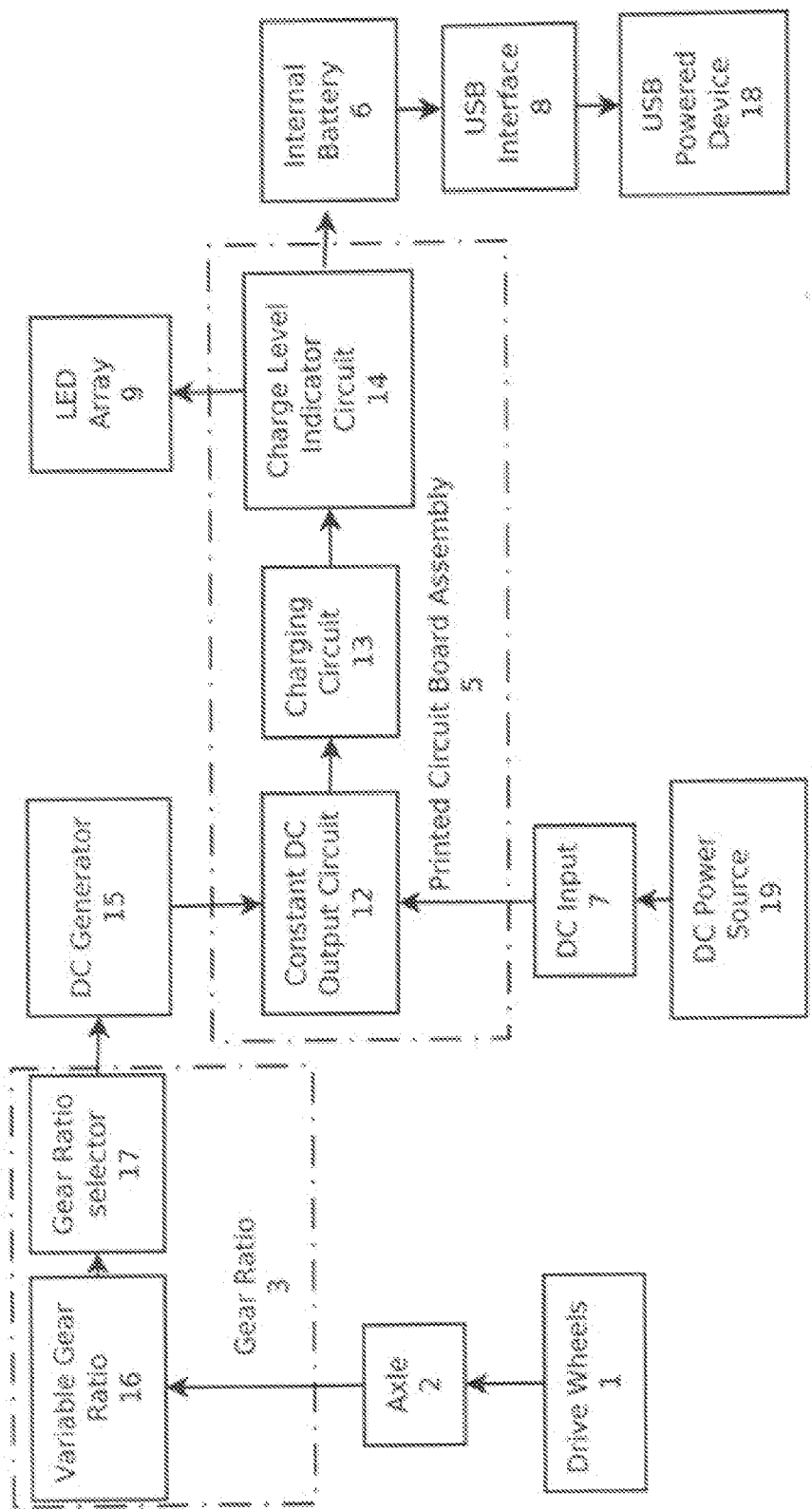
FIG. 4 is a block diagram of an alternate embodiment of the present invention.

Referring now to FIG. 4, a block diagram of an alternate embodiment of the present invention can be seen. This embodiment comprises a DC generator 15 and does not require a rectifier circuit. In this embodiment the gear ratio 3 comprises a variable gear ratio 16 and a gear ratio selector 17.

The factor of the gear ratio 3 can be any number, as dictated by the corresponding application. It is envisioned that one embodiment will have a gear ratio 3 that increases the number of rotations by a factor of 15:1.

The gear ratio 3 is in mechanical communication with the rotor of the DC generator 4. The DC generator 4 produces a DC output when the rotor is rotated by the gear ratio 3. The DC generator is in electrical communication with the PCBA 5. In this embodiment the PCBA 5 comprises a constant DC output Circuit 12, a charging circuit 13 and a charge level indicator circuit 14.

Although the present invention has been described in considerable detail with reference to certain preferred versions thereof, other versions are possible. Therefore the spirit and scope of the appended claims should not be limited to the description of the preferred versions contained therein.

The reader's attention is directed to all papers and document which are filed concurrently with this specification and which are open to public inspection with this specification, and the contents of all such papers and documents are incorporated herein by reference.

All the features disclosed in this specification may be replaced by alterative features serving the same, equivalent or similar purpose, unless expressly stated otherwise. Thus, unless expressly stated otherwise, each feature disclosed is one example only of a generic series of equivalent or similar features.

While the foregoing written description of the invention enables one of ordinary skill to make and use what is considered presently to be the best mode thereof, those of ordinary will understand and appreciate the existence of variations, combinations, and equivalents of the specific embodiment, method, and examples herein. As for "means for" elements, the applicant intends to encompass within the language any structure presently existing or developed in the future that performs the same function. The invention should therefore not be limited by the above described embodiment, method, and examples, but by all embodiments and methods within the scope and spirit of the invention.

What is claimed is:

1. A rolling luggage apparatus incorporating a means for charging electronic devices, comprising:

a) a plurality of drive wheels,
said drive wheels are mechanically attached to at least one axle,
a rotation of the drive wheels produces rotational energy which is mechanically transferred via the axle to a gear ratio,
said gear ratio is in mechanical communication with the axle;

b) a plurality of generators,
the generators having a rotor connected mechanically to the gear ratio;
the generators thereby convert the rotational energy provided by the gear ratio into an AC output;

c) a rectifier circuit,
said rectifier circuit is electrically connected to the generators and converts the AC output into a DC output;

d) a constant DC output circuit,
said constant DC output circuit is electrically connected to the rectifier circuit and limits the DC output to USB standards;

e) a charging circuit,
said charging circuit is electronically connected to the constant DC output circuit,
the charging circuit controls the charging of a plurality of batteries, f) a USB interface,
said USB interface is electronically connected to the charging circuit,
and allows for the mechanical insertion of a USB cable provided by the user wherein the USB cable is mechanically and electronically connected to an electronic device provided by the user, like a phone;

g) an internal battery,
said internal battery is electronically connected to the charging circuit; and h) a charge level indicator circuit,
said charge level indicator circuit is electronically connected to the charging circuit,
said charge level indicator circuit comprising a LED control circuit electronically connected to the charge level indicator circuit and a LED array.

2. An apparatus for charging an electrical device using a rolling means to produce an electrical output comprising:

a) a plurality of drive wheels,
said drive wheels are in mechanical communication with at least one axle;

b) at least one generator,
said generator is in mechanical communication with the axle;
c) a charging circuit;
said charging circuit is electronically connected to the generator;
d) an electro-mechanical interface,
said electro-mechanical interface is electrically connected to the charging circuit and is capable of mechanical communication with an electrical device wherein the electrical device, like a cell phone, is mechanically and electronically connected to the electro-mechanical interface.

3. The apparatus according to claim 2, wherein the generator is a DC generator.

4. The apparatus according to claim 2, wherein the generator is an AC generator.

5. The apparatus according to claim 2, further comprising a constant DC output circuit, said constant DC output circuit comprising a voltage regulator wherein the constant DC output circuit is electrically connected to the generator and the charging circuit.

6. The apparatus according to claim 4, further comprising a rectifier circuit electrically connected to the generator and charging circuit.

7. The apparatus according to claim 5, wherein the constant DC output circuit further comprises a capacitor electrically connected to the constant DC output circuit.

8. The apparatus according to claim 5, wherein the DC output complies with USB standards.

9. The apparatus according to claim 2, further comprising a gear ratio in mechanical communication with the axle and generator.

10. The apparatus according to claim 9, wherein the gear ratio is variable.

11. The apparatus according to claim 2, further comprising a charge level indicator circuit and LED array, each electronically connected to the charging circuit.

12. The apparatus according to claim 2, further comprising an internal battery electrically connected to the charging circuit and able to charge an electrical device attached to the apparatus when the generator is inactive.

13. The apparatus according to claim 2, further comprising a DC input electrically connected to the charging circuit for the purpose of receiving DC power.

14. The apparatus according to claim 13, further comprising an external DC power source, like an AC adapter, is connected to the DC input.

15. The apparatus according to claim 2, wherein the charging circuit can be powered by an external DC power source.

16. The apparatus according to claim 2, wherein the electro-mechanical interface is a USB connector and the DC output complies with USB standards.

17. The apparatus according to claim 15, wherein the external DC power source is from a USB power source.

18. The apparatus according to claim 2, further comprising an enclosure, said enclosure houses the mechanical and electrical components of the apparatus and is in mechanical communication with the axle and piece of rolling luggage.

\* \* \* \* \*